US008292459B2

(12) United States Patent
Mozer et al.

(10) Patent No.: US 8,292,459 B2
(45) Date of Patent: Oct. 23, 2012

(54) NVG COMPATIBLE ILLUMINATION DEVICE BASED ON LIGHT-EMITTING DIODES

(75) Inventors: Laurent Mozer, Merignac (FR); Arnaud Petitdemange, Blanquefort (FR); Olivier Rols, Pessac (FR)

(73) Assignee: Thales, Neuilly-sur Seine (FR)

( * ) Notice: Subject to any disclaimer, the term of this patent is extended or adjusted under 35 U.S.C. 154(b) by 257 days.

(21) Appl. No.: 12/699,161

(22) Filed: Feb. 3, 2010

(65) Prior Publication Data

US 2010/0201288 A1 Aug. 12, 2010

(30) Foreign Application Priority Data

Feb. 6, 2009 (FR) ...................................... 09 00528

(51) Int. Cl.
*G02F 1/1335* (2006.01)
(52) U.S. Cl. ................... 362/235; 362/249.02; 362/800; 362/230; 362/231; 362/249.11
(58) Field of Classification Search ............. 362/249.02, 362/249.11, 249.1, 800, 235, 230, 231
See application file for complete search history.

(56) References Cited

U.S. PATENT DOCUMENTS 5,161,879 A * 11/1992 McDermott .................. 362/206
5,262,880 A 11/1993 Abileah
7,510,527 B1 * 3/2009 Cienfuegos ................... 600/300
7,525,611 B2 * 4/2009 Zagar et al. ..................... 349/68
7,566,155 B2 * 7/2009 Schug et al. ................... 362/545
7,674,227 B1 * 3/2010 Cienfuegos ................... 600/300
2007/0171623 A1 7/2007 Zagar et al.

FOREIGN PATENT DOCUMENTS

JP 06 175601 A 6/1994
* cited by examiner

*Primary Examiner* — Anabel Ton
(74) *Attorney, Agent, or Firm* — LaRiviere, Grubman & Payne, LLP

(57) ABSTRACT

The general field of the invention is that of illumination devices compatible with the use of night vision goggles comprising a light intensifier. The device according to the invention comprises a carpet of three types of light-emitting diodes called green diodes, blue diodes and red diodes emitting in three different spectral bands centered respectively on a first wavelength situated in the green, a second wavelength situated in the blue and a third wavelength situated in the red. The device comprises an optical plate disposed above the carpet of diodes, the zones situated above certain of the red diodes comprising an interferential filter whose optical transmission has a cutoff wavelength situated in the red in the vicinity of 630 nanometers, the height of the interferential filter above the diode and the shape of the filter being chosen so as to filter in part the light emitted by the red diode so as to be compatible with the use of night vision goggles.

2 Claims, 2 Drawing Sheets

NVG COMPATIBLE ILLUMINATION DEVICE BASED ON LIGHT-EMITTING DIODES

PRIORITY CLAIM

This application claims priority to French Patent Application Serial Number 09 00528, entitled NVG Compatible Illumination Device Based on Light-Emitting Diodes, filed Feb. 6, 2009.

FIELD OF THE INVENTION

The field of the invention is that of "NVG" compatible illumination devices based on light-emitting diodes for flat viewing screens such as liquid crystal matrices. The expression "NVG" compatible illumination is understood to mean illumination that may be used with so-called "NVG" (for "Night Vision Goggle") light amplifying goggles, that is to say the illumination does not saturate the amplifying systems of the goggles. Illumination devices are also known under the term "backlighting". Flat screens have multiple applications, they can be used, for example, to make aircraft instrument panel display devices.

DESCRIPTION OF THE PRIOR ART

The illumination of flat liquid crystal screens was initially effected by fluorescent tubes, generally of CCFL type, the acronym standing for "Cold Cathode Fluorescent Light". This technology exhibits a certain number of drawbacks. Mention will be made essentially of the problems of obsolescence, the need for a high-voltage power supply, high power consumption and problems of compatibility with the new environmental standards termed RoHS, the acronym standing for: "Restriction of the use of certain Hazardous Substances in electrical and electronic equipment". To be "NVG" compatible and not saturate the amplifying devices of the goggles, illumination based on fluorescent tubes comprises optical filters, thus adding an additional difficulty.

Fluorescent tubes currently face competition from illumination based on light-emitting diodes which do not exhibit certain of the previous drawbacks. Diodes are pointlike or quasi-pointlike light sources emitting in a given emission cone, most diodes having a so-called Lambertian emission profile. Several optical devices have been proposed for illuminating a flat screen in a homogeneous manner using point sources. Thus, the illumination device can consist of a "carpet" of light-emitting diodes disposed under the screen. Generally, three types of diodes are used, emitting in three different spectral bands in the visible spectrum in such a way that the mixing of the emitted beams gives white light. Generally, the diodes emit in the red, the green and the blue.

It is known that the amplifying devices of night vision goggles have a significant amplification coefficient in a spectral band beginning at the red end of the visible spectrum, around 650 nanometers and finishing in the near infrared, around 930 nanometers. Diodes emitting in the green or in the blue are naturally "NVG" compatible, their emission in the red or the near infrared being very weak or nonexistent. The same does not hold for diodes emitting in the red which must be filtered so as not to saturate the goggles. The filtering problem is not simple. Indeed, it must be sufficient to ensure "NVG" compatibility and not be too great so that the colorimetry remains correct, that is to say so that the red colour remains red and does not become either too orangey or too dark. "NVG" compatibility forms the subject of particularly strict international standards such as the MIL STD 3009 standard. The colorimetry problems are very important in so far as, in a large number of applications, red is associated with alai ins and must be perfectly identified as such. It should also be noted that the sensitivity of the eye decreases very rapidly in the red part of the spectrum, further complicating the production of the filter. Finally, not all types of red diodes have strictly the same spectral distribution. Thus, each change of diode is accompanied by a new optimization of the filtering means.

SUMMARY OF THE INVENTION

To alleviate these various drawbacks, the device according to the invention comprises an interferential filter disposed above the diode, the filter having a determined diameter. Thus, to ensure "NVG" compatibility and maintain satisfactory colorimetry, two types of parameters are employed, the photometric parameters of the filter and on the other hand the geometric parameters which make it possible to "dose" the quantity of red light filtered by the optical filter.

More precisely, the subject of the invention is an illumination device compatible with the use of night vision goggles comprising a light intensifier, the said device comprising at least one carpet of diodes comprising three types of light-emitting diodes called green diodes, blue diodes and red diodes emitting in three different spectral bands centred respectively on a first wavelength situated in the green, a second wavelength situated in the blue and a third wavelength situated in the red, characterized in that the device comprises an optical plate disposed above the carpet of diodes, the zones situated above certain of the red diodes comprising an interferential filter whose optical transmission has a cutoff wavelength situated in the red in the vicinity of 630 nanometers, the height of the interferential filter above the diode and the shape of the filter being chosen in such a way as to filter the light emitted by the red diode so as to be compatible with the use of night vision goggles.

Advantageously, the device comprises control means ensuring two operating modes termed daytime and nighttime, in daytime mode, the blue, green and red diodes are turned on, in night-time mode, the blue diodes, the green diodes and only the filtered red diodes are turned on.

BRIEF DESCRIPTION OF THE DRAWINGS

The invention will be better understood and other advantages will become apparent on reading the nonlimiting description which follows and by virtue of the appended figures among which.

DETAILED DESCRIPTION OF THE DRAWINGS

Figure 1:
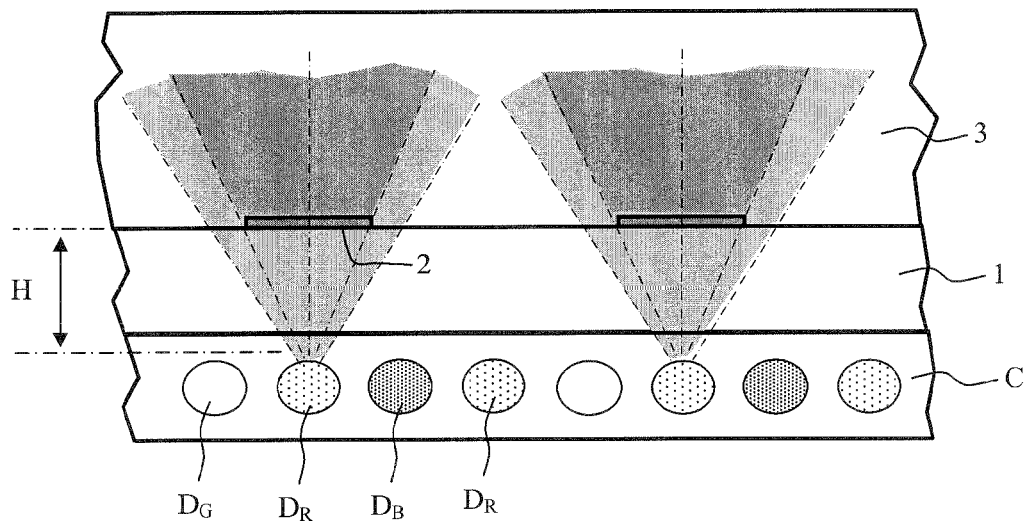
FIG. 1 represents a sectional view of a device according to the invention.

FIG. 1 represents an illumination device according to the invention. It comprises a carpet C of light-emitting diodes comprising green diodes $D_G$ emitting in a first spectral band centred on a first wavelength situated in the green, blue diodes $D_B$ emitting in a second spectral band centred on a second wavelength situated in the blue and red diodes $D_R$ emitting in a third spectral band centred on a third wavelength situated in the red. The device comprises an optical plate 1 disposed above the carpet of diodes. This plate comprises a plurality of interferential filters 2 disposed in zones situated above certain of the red diodes at a height H.

Figure 3:
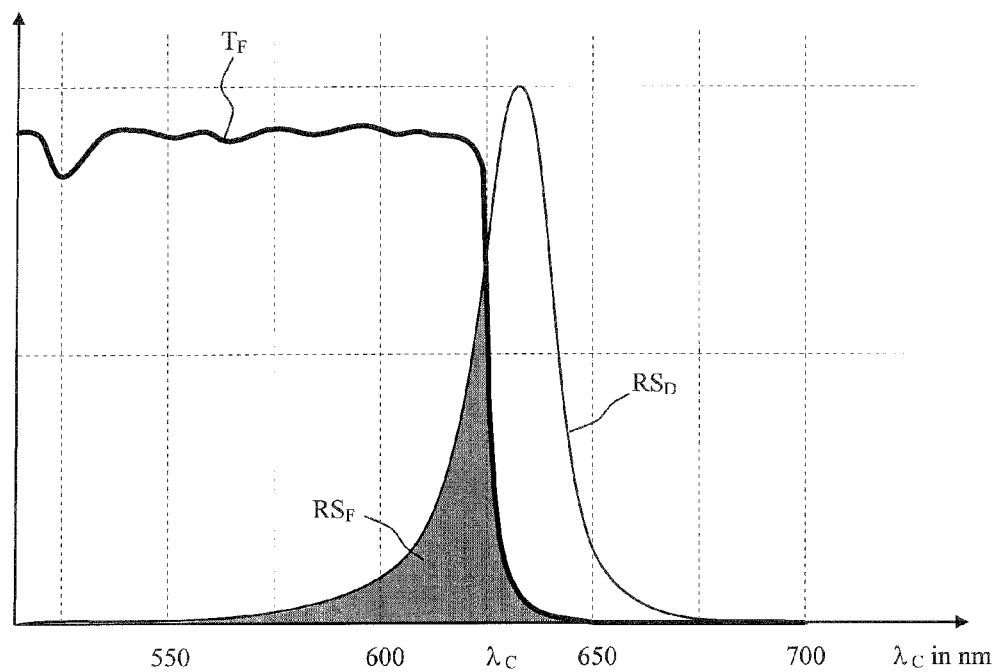
FIG. 3 represents the transmission of the optical filter as a function of wavelength and the spectral distribution of the emission spectrum of a red diode.

As indicated in FIG. 3 which represents the optical transmission $T_F$ of the filters as a function of wavelength $\lambda$, the filters 2 have a cutoff wavelength $\lambda_C$ situated in the red in the vicinity of 630 nanometers so as to ensure the compatibility of the radiation transmitted by the filter with the use of night vision goggles.

Figure 2:
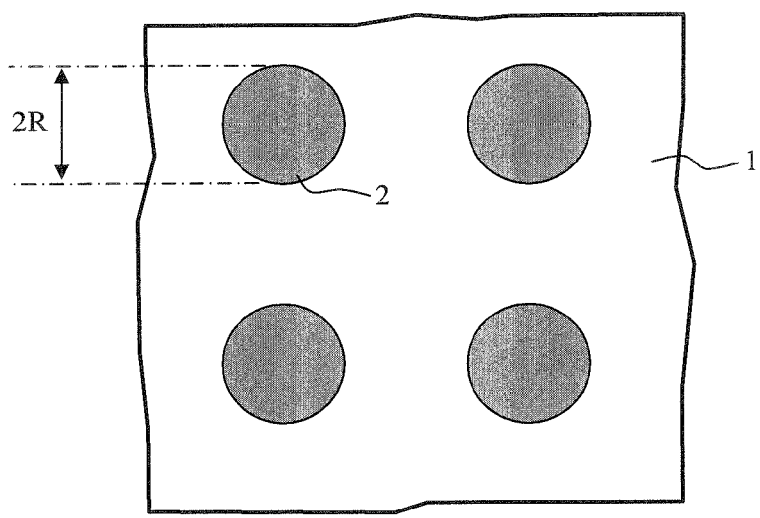
FIG. 2 represents a view from above of the optical filters.

The filters have a radially symmetric geometric shape; the simplest shape to implement is the circle as indicated in FIG. 2 which represents a view from above of the optical filters 2. But, it is possible to use more sophisticated shapes. By way of example, the shape of the filters can consist of concentric annuli or comprise patterns. In the simple case where the shape of the filters is a circle of radius R, the filter acts on the radiation of the red diode that is emitted in a solid angle with vertex angle $\theta$ where $\tan(\theta)$ equals R/H. The remainder of the radiation emitted by the red diode is not filtered, as seen in FIG. 1 where the radiation transmitted by the filter is represented in dark grey and the radiation transmitted directly by the diode is represented in light grey.

Also represented in FIG. 3 is the spectral distribution $RS_D$ of the emission spectrum of a red diode. Thus, with the device according to the invention, a first flux whose spectral distribution $RS_F$ is represented in dark grey in FIG. 3 is transmitted through the optical filter, a second flux whose spectral distribution is that of the diode is transmitted without having passed through the filter. By altering the height of the filter and its shape, the luminous flux arising from the red diode can be distributed as desired between the filtered flux and the unfiltered flux. It is thus possible to obtain "NVG" compatibility and satisfactory colorimetry at one and the same time.

By way of example, for a diode having the following characteristics:

Width of luminous intensity indicator: 40 degrees at mid-height,

Spectrum of the diode having an emission peak centred on 630 nanometers and a dominant wavelength lying between 610 and 615 nanometers;

The filter having a cutoff wavelength situated in the red in the vicinity of 630 nanometers, the radius of the filter being of the order of 6 millimeters, the height of the filter above the diode of the order of 15 millimeters.

The compatibility of the filtered diode with the MIL-STD-3009 standard is ensured and the colorimetric coordinates of the light emitted by the filtered diode through the LCD matrix of the screen are, in (u', v') coordinates according to the CIE 1976 standard, such that u' exceeds 0.42. It is generally considered that when the value of the coordinate u' is greater than this value, the colour appears red, which is indeed the desired aim.

The device also comprises above this plate a light guide 3 which ensures the mixing of the luminous fluxes originating from the various diodes so as to obtain uniform and "white" illumination. This guide can be a simple transparent plate with plane and parallel faces, whose thickness is sufficient to ensure correct mixing. This guide can be a more sophisticated component comprising, for example, prismatic parts making it possible to obtain homogeneity of luminous flux within smaller confines than those of a simple plate.

The device is able to operate in daytime and at night-time. It comprises electronic control means ensuring the two operating modes. In daytime mode, the electronic control means drive the blue, green and unfiltered red diodes which are turned on. In night-time mode, the blue diodes, the green diodes and only the filtered red diodes are turned on. Of course, the control means make it possible to adjust the luminous fluxes emitted either by varying the strength of current flowing in the diodes, or by varying the turn-on times of the diodes, a technique termed PWM for "Pulse Width Modulator"

What is claimed is:

1. An illumination device for use in night vision goggles comprising:
- a. A light intensifier in a night vision goggle;
- b. At least one carpet of laser diodes including
  - i. Green diodes that emit light in a spectral band situated in the green,
  - ii. Blue diodes that emit light in a spectral band situated in the blue, and
  - iii. Red diodes that emit light in a spectral band situated in the red;
- c. An optical plate positioned above the carpet of laser diodes, said optical plate including:
  - i. Zones situated above selected ones of the red diodes which function as an interferential filter having an optical transmission cutoff wavelength in the range from about 620 nm to 640 nm; and
  - ii. Having a height of the optical plate and the distance of the optical plate above the carpet of laser diodes being selected such that only a portion of the light from the selected red diodes is acted upon by the interferential filter, the remainder of the light is being transmitted without being filtered.

2. Illumination device according to claim 1, further comprising control means for providing a daytime mode in which the blue, green and red diodes are turned on, and a night-time mode in which the blue, green and only the filtered red diodes are turned on.

\* \* \* \* \*